US010788705B2

(12) United States Patent
He

(10) Patent No.: US 10,788,705 B2
(45) Date of Patent: Sep. 29, 2020

(54) BACKLIGHT MODULE AND MANUFACTURING METHOD THEREOF

(71) Applicant: HKC CORPORATION LIMITED, Guangdong (CN)

(72) Inventor: Huailiang He, Guangdong (CN)

(73) Assignee: HKC CORPORATION LIMITED, Shenzhen, Guangdong (CN)

( * ) Notice: Subject to any disclaimer, the term of this patent is extended or adjusted under 35 U.S.C. 154(b) by 357 days.

(21) Appl. No.: 15/739,291

(22) PCT Filed: Sep. 18, 2017

(86) PCT No.: PCT/CN2017/102019
§ 371 (c)(1),
(2) Date: Dec. 22, 2017

(87) PCT Pub. No.: WO2019/041389
PCT Pub. Date: Mar. 7, 2019

(65) Prior Publication Data
US 2020/0073175 A1    Mar. 5, 2020

(30) Foreign Application Priority Data
Aug. 28, 2017 (CN) .......................... 2017 1 0750840

(51) Int. Cl.
*G02F 1/13357*    (2006.01)
(52) U.S. Cl.
CPC .. *G02F 1/133606* (2013.01); *G02F 1/133605* (2013.01); *G02F 1/133611* (2013.01);
(Continued)

(58) Field of Classification Search
CPC ......... G02F 1/133605; G02F 1/133606; G02F 1/133611; G02F 2001/133612; G02F 2201/44; G02F 2202/28; G02F 2202/36
See application file for complete search history.

(56) References Cited

U.S. PATENT DOCUMENTS

2009/0194774 A1    8/2009 Huang et al.
2014/0248726 A1*   9/2014 Chung ................... H01L 51/56
                                                                438/27
(Continued)

FOREIGN PATENT DOCUMENTS

CN    104421772 A    3/2015
CN    104864318 A    8/2015
(Continued)

OTHER PUBLICATIONS

International Search Report dated May 25, 2018, in the corresponding PCT application PCT/CN2017/102019, 9 pages in Chinese.

*Primary Examiner* — Julie A Bannan
(74) *Attorney, Agent, or Firm* — Juan Carlos A. Marquez; Marquez IP Law Office, PLLC

(57) ABSTRACT

The present invention relates to a backlight module and manufacturing method thereof. The backlight module comprises: a soft substrate having an outer surface and a flexible substrate; a reflective layer disposed on the outer surface of the soft substrate; a white quantum dot light emitting layer disposed on the soft substrate; an electrode layer disposed on the white quantum dot light emitting layer and covering the soft substrate.

20 Claims, 8 Drawing Sheets

(52) U.S. Cl.
CPC ............ *G02F 2001/133612* (2013.01); *G02F 2201/44* (2013.01); *G02F 2202/28* (2013.01); *G02F 2202/36* (2013.01)

(56) References Cited

U.S. PATENT DOCUMENTS

| | | | | |
|---|---|---|---|---|
| 2015/0287927 A1* | 10/2015 | Okubo | ................... | B82Y 20/00 257/40 |
| 2016/0003998 A1* | 1/2016 | Benoit | .............. | G02F 1/133502 349/71 |
| 2017/0115440 A1* | 4/2017 | Zhu | ........................ | G02B 6/005 |
| 2017/0320307 A1* | 11/2017 | Iwase | ....................... | B32B 27/30 |
| 2018/0203302 A1* | 7/2018 | Kim | ..................... | C08L 101/00 |

FOREIGN PATENT DOCUMENTS

| | | |
|---|---|---|
| CN | 105202396 A | 12/2015 |
| CN | 106990606 A | 7/2017 |

\* cited by examiner

BACKLIGHT MODULE AND MANUFACTURING METHOD THEREOF

BACKGROUND OF THE INVENTION

Field of Invention

The present invention generally relates to a backlight module design, and especially to a backlight module and manufacturing method thereof.

Description of Related Art

A backlight module is a key component widely used in a variety of flat-panel displays, especially in a liquid crystal display (LCD). Generally speaking, a backlight module is disposed on the backside of a display panel. According to different requirements or demands of the liquid crystal display (LCD), a backlight module mainly includes a direct-lighting type backlight module or a side-lighting type backlight module.

A thin film transistor (TFT) liquid crystal display (LCD) includes not only a glass substrate, but also a backlight module cooperating with the glass substrate for displaying effectively. A traditional side-lighting type backlight module uses a light-emitting diode chip attached to a side of the light guide plate. Since the size of the light-emitting diode (LED) chip is very large and all of the light-emitting diode (LED) light bars must be integrated to form an integrated circuit board (IC), the traditional side-lighting type backlight module is not suitable for a flexible display panel design. A backlight structure of a general liquid crystal display (LCD) comprises a backlight source, a light guide plate, a diffusion plate and a prism plate, etc. Since the foregoing components are assembled by manpower and the limitations of optical properties of the foregoing components exist, it is difficult to develop a thin and light display panel structure.

SUMMARY OF THE INVENTION

For resolving the technical problems above-mentioned, the objects of the present invention are to provide a new automated production backlight module design, and especially to a backlight module comprising: a soft flexible substrate having an outer surface and a flexible substrate; a reflective layer disposed on the outer surface of the soft flexible substrate; a white quantum dot light emitting layer disposed on the soft flexible substrate; and an electrode layer disposed on the white quantum dot light emitting layer and covering the soft flexible substrate.

The objects and technical solutions of the present invention can be further implemented by following technical configuration and means.

In another perspective, the present backlight module comprises: a soft flexible substrate having an outer surface and a flexible substrate; a reflective layer disposed on the outer surface of the soft flexible substrate; a white quantum dot light emitting layer disposed on the soft flexible substrate; an electrode layer disposed on the white quantum dot light emitting layer and covering the soft flexible substrate; a first diffusion layer disposed on the electrode layer; a brightening layer disposed on the first diffusion layer; a second diffusion layer disposed on the brightening layer; and an adhesive material layer disposed between the brightening layer and the second diffusion layer, wherein the adhesive material layer is used for adhering the brightening layer on the second diffusion layer; wherein the white quantum dot light emitting layer emits light by using an electroluminescence of the quantum dot; the reflective layer is adhered on the outer surface of the soft flexible substrate for upward reflecting the light emitted from the bottom surface of the white quantum dot light emitting layer 114.

In another perspective, the present manufacturing method of a backlight module comprises: providing a soft flexible substrate having an outer surface and a flexible substrate; forming a reflective layer on the outer surface of the soft flexible substrate; forming a white quantum dot light emitting layer on the soft flexible substrate, wherein the white quantum dot light emitting layer covers the soft flexible substrate by a coating process; forming an electrode layer on the white quantum dot light emitting layer and covering the soft flexible substrate; forming a first diffusion layer on the electrode layer; forming a brightening layer on the first diffusion layer; forming a second diffusion layer on the brightening layer; and forming an adhesive material layer on the brightening layer simultaneously for adhering the second diffusion layer.

In one embodiment of the present invention, the backlight module further comprises a first diffusion layer disposed on the electrode layer; a brightening layer disposed on the first diffusion layer; a second diffusion layer disposed on the brightening layer; and an adhesive material layer disposed between the brightening layer and the second diffusion layer; wherein the adhesive material layer is used for adhering the brightening layer on the second diffusion layer.

In one embodiment of the present invention, the soft flexible substrate is patterned by semiconductor processes, such as a photo lithography process and an etching process to form a required optical structure. The material of the reflective layer includes titanium dioxide, aluminum or a composite material thereof.

In one embodiment of the present invention, the white quantum dot light emitting layer emits a light using an electroluminescence of the quantum dot.

In one embodiment of the present invention, the material of the adhesive material layer can include silane-based compounds, UV-curing adhesives, transparent optic adhesives, glass adhesives or thermal-curing adhesives.

In one embodiment of the present manufacturing method, the present invention further comprises patterning optical structures on each layer by using a roller equipment and a printing process.

In one embodiment of the present manufacturing method, the foregoing step of forming an adhesive material layer on the brightening layer simultaneously for adhering the second diffusion layer comprises: forming an adhesive material layer on the brightening layer; and adhering the backlight module on a liquid crystal display (LCD) by a packaging process using the adhesive material layer.

In one embodiment of the present manufacturing method, the soft flexible substrate is patterned by semiconductor processes, such as a photo lithography process and an etching process to form a required optical structure. The material of the reflective layer includes titanium dioxide, aluminum or a composite material thereof; and the material of the adhesive material layer includes silane-based compounds, UV-curing adhesives, transparent optic adhesives, glass adhesives or thermal-curing adhesives.

The advantages of the present invention include reducing a thickness of a backlight module to achieve a light and thin backlight module, saving manpower cost, and improving production efficiency.

DESCRIPTION OF THE PREFERRED EMBODIMENTS

Figure 1:
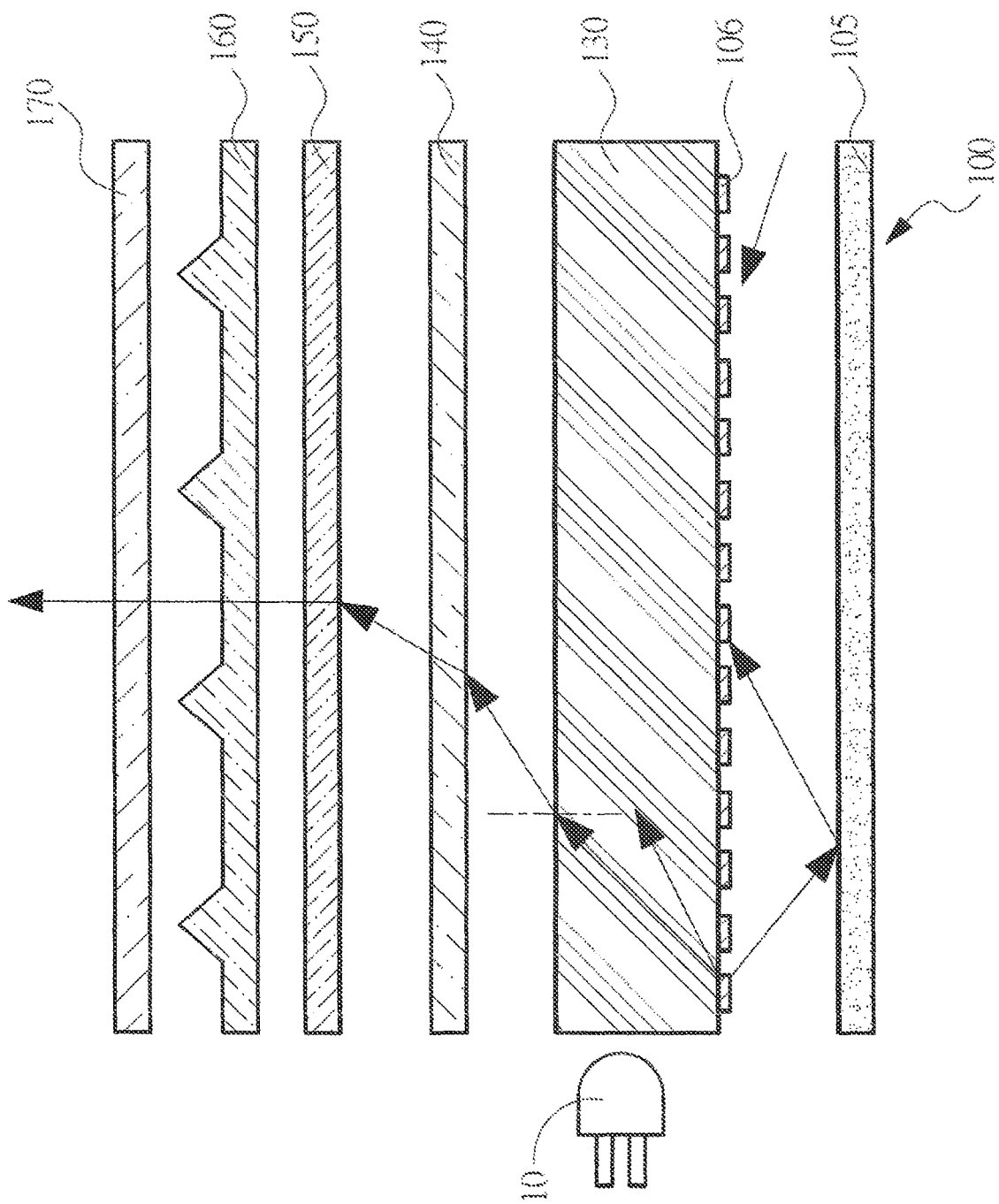
FIG. 1 shows an example of backlight structure of a liquid crystal display (LCD).

The drawings as referred to following embodiments throughout the description of the present invention are examples for implementing the objects of the present invention. The orientation words or terms used in the description of the present invention, such as "above", "under", "forward", "backward", "left", "right", "inner", "outer", and "side". are examples in the drawings for illustrative purpose only, or just show the interrelations between the components, but not to be construed as limitations to the scope of the present invention.

The drawings and the description of the present invention are deemed to be examples but not limitations essentially. In the drawings, components or elements having similar or same structure are marked with the same numbers. In addition, sizes and thicknesses of every component or element are just examples, but not drawn according to the actual scale and not read as limitations to the scope of the present invention.

In drawings of the present invention, sizes and thicknesses of layers, films, panels, or regions are emphasized for clearness, easy to describe and easy to understand. Therefore, some layers, films, or regions are emphasized but not drawn according to their actual scales. It is to be understood that, for example, when one of the components of layers, films, regions, or substrate are "on" another component of layers, films, regions, or substrate, the one of the components of layers, films, regions, or substrate could be adjacent on another component of layers, films, regions, or substrate directly, or there could be other inter-components of layers, films, regions, or substrate disposed therebetween.

Furthermore, in the description of the present invention, a word "comprising" or "including" is construed to comprise or include the related components, but not exclude other components, except there is clearly opposite word or description in the present invention. And, in the description of the present invention, a word "on" can be construed to be above or under a target component, but not only construed to be on a top of the target component in vertical or gravity direction.

For further clarifying the technical solutions or functions of the present invention to implement the objects of the present invention, a backlight module and manufacturing method thereof, and their specific implementations, structures, features and functions, according to a preferred embodiment of the present invention will be apparent from the following detailed description with reference to the accompanying drawings.

The present display apparatus can include a liquid crystal display panel and a backlight module, disposed oppositely to each other. The liquid crystal display panel can include a color filter (CF) substrate, a thin film transistor (TFT) substrate, and a liquid crystal layer formed between the thin film transistor (TFT) substrate and the color filter (CF) substrate. The color filter (CF) substrate, the thin film transistor (TFT) substrate and the liquid crystal layer can form a plurality of pixel units in an array configuration. A light emits from the backlight module and passes through the liquid crystal display panel to show colors and form an image by the pixel units of the liquid crystal display panel.

In one embodiment of the present invention, the liquid crystal display panel can be a curved display panel, and the display apparatus can be a curved display apparatus.

In current technology, a liquid crystal display apparatus manufacturer uses a photo-alignment technology to control the alignment directions of liquid crystal molecules in the wide viewing angle technology of a vertical alignment (VA) type liquid crystal display (LCD) panel for improving an optical performance and yield rate of the liquid crystal display (LCD) panel. The photo-alignment technology is that multi-domain alignment regions can be formed in each pixel unit of the liquid crystal display (LCD) panel, so that the alignment directions of liquid crystal molecules can be inclined to different directions, such as four different directions. In the photo-alignment technology, for example, an ultraviolet (UV) light source (ex: an ultraviolet polarized light) can be illuminated on a polymer film (an alignment film) of a color filter (CF) substrate or a thin film transistor (TFT) substrate. Then the polymer structure on the surface of the polymer film generates photo-polymerization, isomerization or cleavage reactions non-uniformly, resulting in specific directions for the chemical bond structure on the surface of the polymer film. Therefore, the liquid crystal molecules can be aligned along the specific directions to achieve the object of the photo-alignment technology.

According to the orientation types of the liquid crystals, a current market has many different types for the liquid crystal display (LCD) panel, such as: a vertical alignment (VA) type liquid crystal display (LCD) panel, a twisted nematic (TN) type liquid crystal display (LCD) panel, a super twisted nematic (STN) type liquid crystal display (LCD) panel, an in-plane switching (IPS) type liquid crystal display (LCD) panel, and a fringe field switching (FFS) type liquid crystal display (LCD) panel. The vertical alignment (VA) type liquid crystal display (LCD) comprises, for example, a patterned vertical alignment (PVA) type liquid crystal display (LCD) or a multi-domain vertical alignment (MVA) type liquid crystal display (LCD). The patterned vertical alignment (PVA) type liquid crystal display (LCD) uses a fringe field effect and a compensation plate to achieve a wide viewing angle effect. The multi-domain vertical alignment (MVA) type liquid crystal display (LCD) divides a pixel into multiple regions, and uses protrusion structures or specific patterned structure to allow liquid crystal molecules in different regions to be inclined in different directions to achieve a wide viewing angle effect. In the in-plane switching (IPS) type liquid crystal display (LCD) panel or the fringe field switching (FFS) type liquid crystal display (LCD) panel, liquid crystal molecules are driven in a direction parallel to an in-plane direction of a substrate corresponding to an electric field applied on the substrate and contains a component substantially parallel to the in-plane direction of the substrate. Therefore, both of the in-plane switching (IPS) type liquid crystal display (LCD) panel and the fringe field switching (FFS) type liquid crystal display (LCD) panel have an advantage of the wide viewing angle.

A backlight module (BLM) is a key component for a thin film transistor (TFT) liquid crystal display (LCD). Since the thin film transistor (TFT) liquid crystal display (LCD) is a kind of non-self-luminous display, and needs a light source to emit light and pass some related components, such as a light guide structure, a diffusion plate, a prism plate and liquid crystal panel, of the thin film transistor (TFT) liquid crystal display (LCD) to reach human eyes, to form an image to obtain a display function.

A backlight module can be divided into a side-lighting type (or edge type) backlight module and a direct-lighting type backlight module according to the locations of the light source, wherein the light source is disposed on one side of the light guide structure for the side-lighting type backlight module.

FIG. 1 shows an example of backlight structure of a liquid crystal display (LCD). Please refer to FIG. 1, a backlight module 100 of a traditional liquid crystal display (LCD) comprises a light source (for example: a light-emitting diode) 10, a light guide plate 130, a mesh layer 106, a reflective plate 105, a bottom diffusion plate 140, a bottom prism plate 150, a top prism plate 160 and a top diffusion plate 170. At first, the light source 10 is used for emitting light to the liquid crystal display (LCD). Currently, there are a variety of light sources applied in the liquid crystal display (LCD). The light guide plate 130 is disposed under a liquid crystal display panel and adjacent to one side of the light source 10. The light guide plate 130 is used for transforming a point-scattering light from the light source 10 into a plane-scattering light, and the plane-scattering light is then projected on the liquid crystal display panel.

The reflective plate 105 is disposed under the light guide plate 130. The reflective plate 105 is used for reflecting the light emitted from the light source 10 to the liquid crystal display panel disposed in front of the reflective plate 105. The bottom diffusion plate 140 is disposed above the light guide plate 130 for homogenizing the light passing through the light guide plate 130. When the light passes through the diffusion plate 140, the light is diffused in both a horizontal direction and a vertical direction. When the light is diffused, light brightness is getting reduced quickly. The bottom prism plate 150 and the top prism plate 160 are used for refracting and concentrating the light for improving the light brightness. The bottom prism plate 150 and the top prism plate 160 are generally arranged in a mutually perpendicular manner.

Generally speaking, when the bottom prism plate 150 and the top prism plate 160 are disposed normally, a plurality of prism units are arranged in a regular direction on a transparent material film. The bottom prism plate 150 and the top prism plate 160 are used for refracting the light passing through the light guide plate 130 and diffused by the bottom diffusion plate 140 and the top diffusion plate 170. Generally speaking, when the light transmits and is refracted through a smaller width, the light passing through regions for light transmission and light refraction is brighter. On the contrary, when the light transmits and is refracted through a larger width, the light passing through regions for light transmission and light refraction is dimmer.

Figure 2:
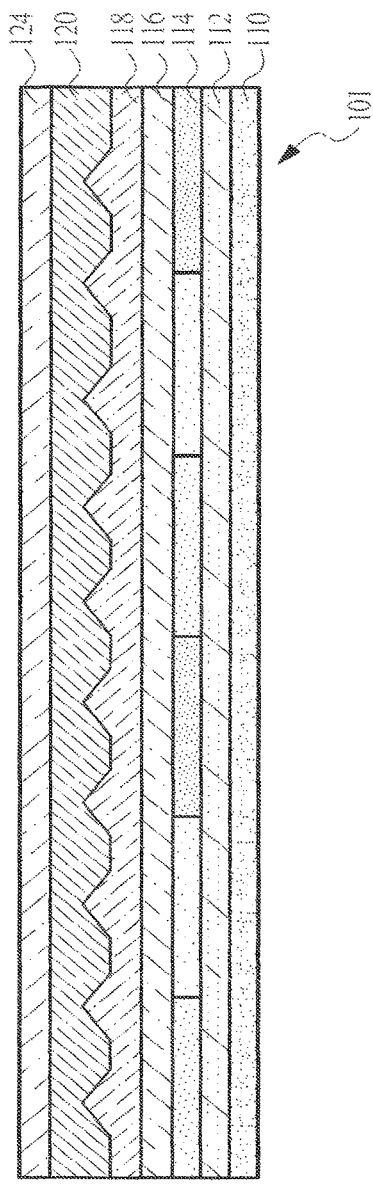
FIG. 2 shows a backlight module structure on a flexible substrate plate according to one embodiment of the present invention.
Figure 3:
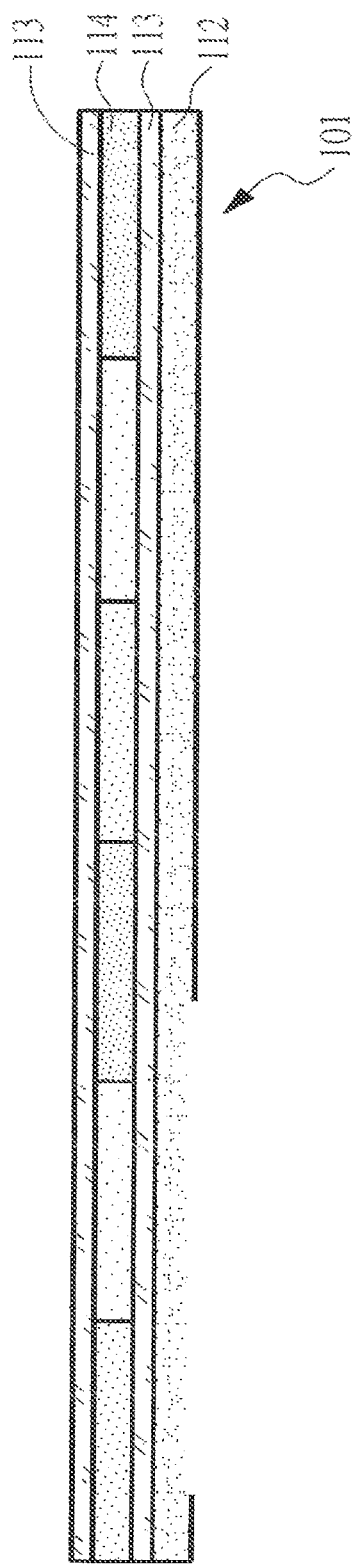
FIG. 3 shows an electrode layer disposed on a white quantum dot light emitting layer on a flexible substrate plate according to one embodiment of the present invention.

FIG. 2 shows a backlight module structure on a flexible substrate plate according to one embodiment of the present invention, and FIG. 3 shows an electrode layer disposed on a white quantum dot light emitting layer on a flexible substrate plate according to one embodiment of the present invention. Please refer to FIGS. 2 and 3, in one embodiment of the present invention, a backlight module 101 comprises: a soft flexible substrate 112 having an outer surface and a flexible substrate; a reflective layer 110 disposed on the outer surface of the soft flexible substrate 112; a white quantum dot light emitting layer 114 disposed on the soft flexible substrate 112; an electrode layer 113 disposed on the white quantum dot light emitting layer 114 and covering the soft flexible substrate 112; a first diffusion layer 116 disposed on the electrode layer 113; a brightening layer 118 disposed on the first diffusion layer 116; a second diffusion layer 124 disposed on the brightening layer 118; and an adhesive material layer 120 disposed between the brightening layer 118 and the second diffusion layer 124, wherein the adhesive material layer 120 is used for adhering the brightening layer 118 to the second diffusion layer 124. While the backlight module 101 is rolled out from a cylindrical material roll, the surface of the backlight module 101 is processed. And the backlight module 101 is rolled to form a cylindrical roll again or cut. Then the backlight module 101 is adhered to a substrate.

In one embodiment of the present invention, the soft flexible substrate 112 is patterned by semiconductor processes, such as a photo lithography process and an etching process to form a required optical structure.

In one embodiment of the present invention, the material of the reflective layer 110 includes titanium dioxide, aluminum or a composite material thereof.

In one embodiment of the present invention, the white quantum dot light emitting layer 114 emits a white quantum dot light.

In one embodiment of the present invention, the white quantum dot light emitting layer 114 emits light by using an electroluminescence of the quantum dot.

In one embodiment of the present invention, the material of the adhesive material layer 120 can include silane-based compounds, UV-curing adhesives, transparent optic adhesives, glass adhesives or thermal-curing adhesives.

Please refer to FIGS. 2 and 3, in one embodiment of the present invention, a backlight module 101 comprises: a soft flexible substrate 112 having an outer surface and a flexible substrate; a reflective layer 110 disposed on the outer surface of the soft flexible substrate 112; a white quantum dot light emitting layer 114 disposed on the soft flexible substrate 112 and using a blue light source illuminating on quantum dots of the white quantum dot light emitting layer 114 the to provide a red light and a green light; an electrode layer 113 disposed on the white quantum dot light emitting layer 114 and covering the soft flexible substrate 112; a first diffusion layer 116 disposed on the electrode layer 113; a brightening layer 118 disposed on the first diffusion layer 116; a second diffusion layer 124 disposed on the brightening layer 118; and an adhesive material layer 120 disposed between the brightening layer 118 and the second diffusion layer 124; wherein the adhesive material layer 120 is used for adhering the brightening layer 118 on the second diffusion layer 124; wherein the white quantum dot light emitting layer 114 emits light by using an electroluminescence of the quantum dot, and using a printed lighting material for providing a light source; wherein the reflective layer 110 adheres to the outer surface of the soft flexible substrate 112 for upward reflecting the light emitted from the bottom surface of the white quantum dot light emitting layer 114.

Figure 4A:
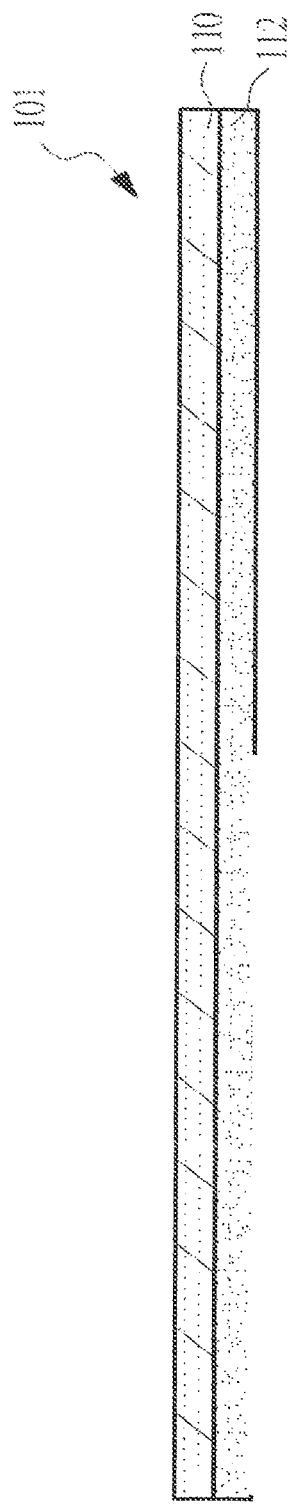
FIG. 4a shows a cross-sectional view illustrating a soft flexible substrate and a reflective layer on a flexible substrate plate according to one embodiment of the present invention.
Figure 4B:
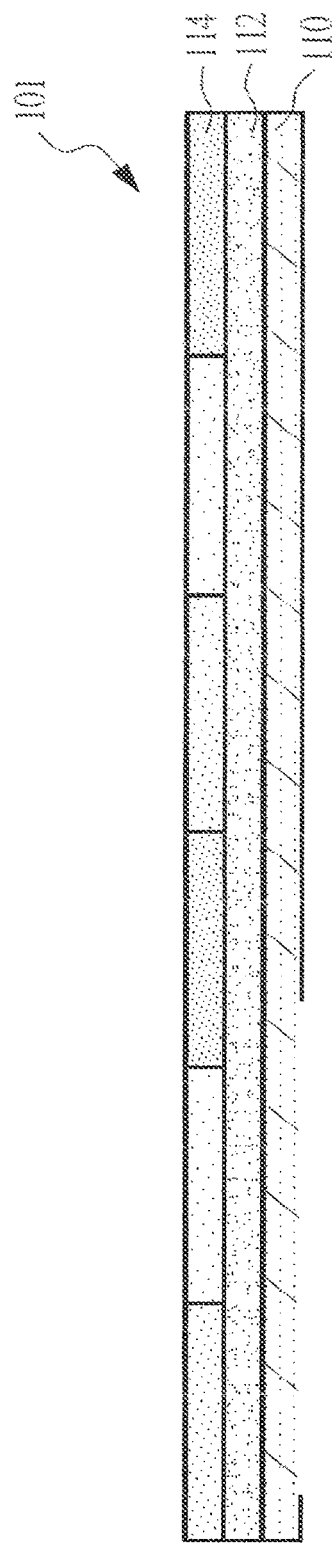
FIG. 4b shows a cross-sectional view illustrating a soft flexible substrate, a reflective layer and a white quantum dot light emitting layer on a flexible substrate plate according to one embodiment of the present invention.
Figure 4C:
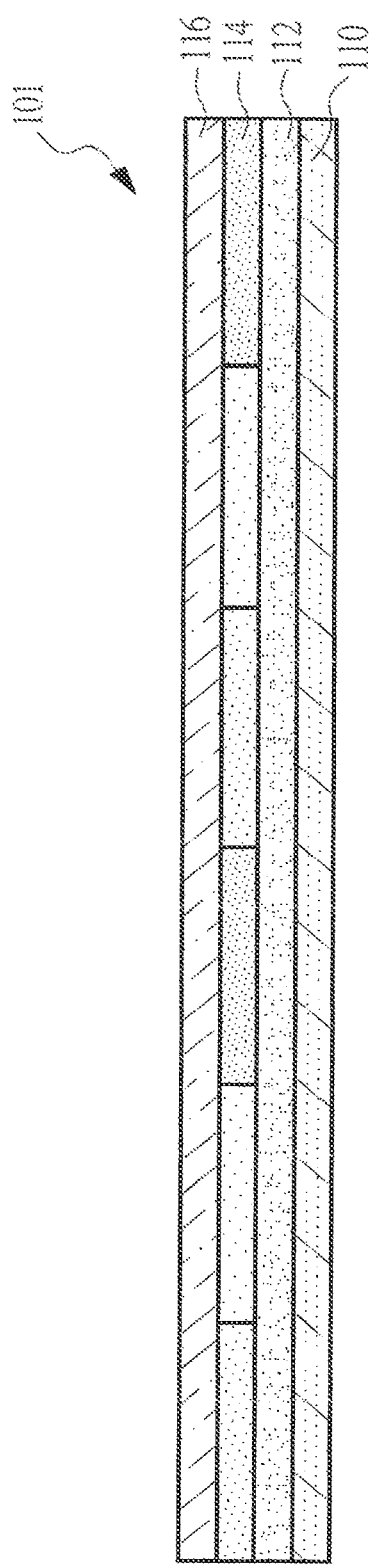
FIG. 4c shows a cross-sectional view illustrating a soft flexible substrate, a reflective layer, a white quantum dot light emitting layer and a first diffusion layer on a flexible substrate plate according to one embodiment of the present manufacturing method.
Figure 4D:
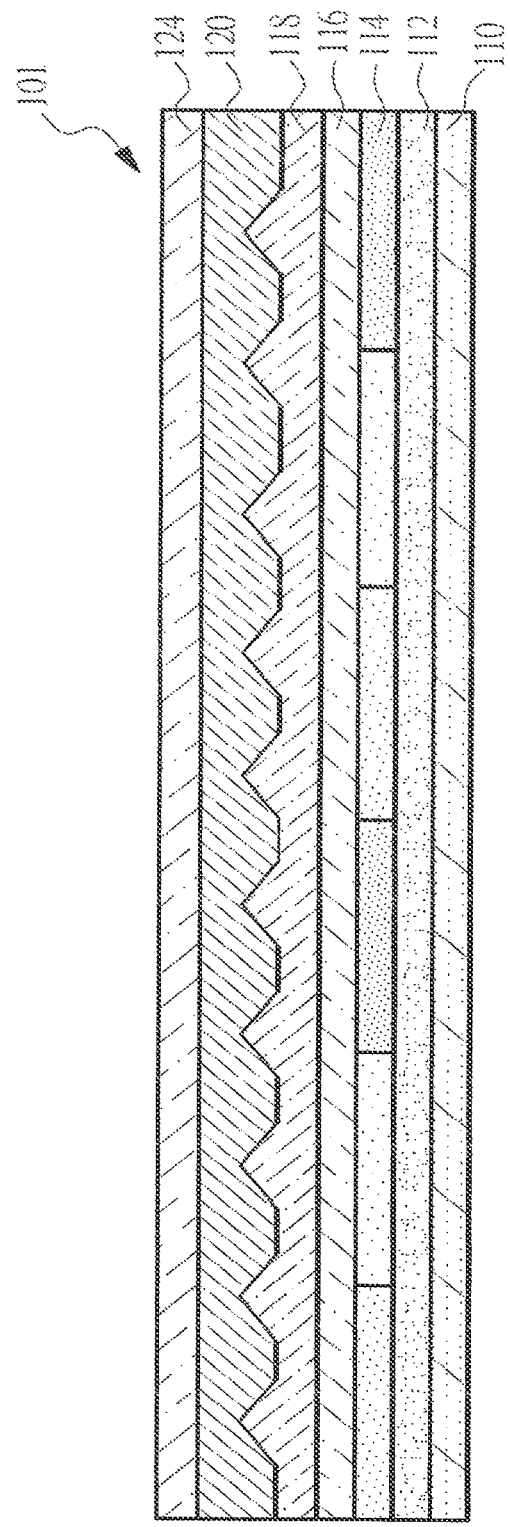
FIG. 4d shows a cross-sectional view illustrating a backlight module structure according to one embodiment of the present manufacturing method.

FIG. 4a shows a cross-sectional view illustrating a soft flexible substrate and a reflective layer on a flexible substrate plate according to one embodiment of the present invention. FIG. 4b shows a cross-sectional view illustrating a soft flexible substrate, a reflective layer and a white quantum dot light emitting layer on a flexible substrate plate according to one embodiment of the present invention. FIG. 4c shows a cross-sectional view illustrating a soft flexible substrate, a reflective layer, a white quantum dot light emitting layer and a first diffusion layer on a flexible substrate plate according to one embodiment of the present manufacturing method. FIG. 4d shows a cross-sectional view illustrating a backlight module structure according to one embodiment of the present manufacturing method. Please refer to FIGS. 3 and 4a-4d, in one embodiment of the present invention, a manufacturing method of a backlight module 101 comprises: providing a soft flexible substrate 112 having an outer surface and a flexible substrate; forming a reflective layer 110 on the outer surface of the soft flexible substrate 112; forming a white quantum dot light emitting layer 114 on the soft flexible substrate 112 and covering the soft flexible substrate 112 by a coating process; forming an electrode layer 113 on the white quantum dot light emitting layer 114 and covering the soft flexible substrate 112; forming a first diffusion layer 116 on the electrode layer 113; forming a brightening layer 118 on the first diffusion layer 116; forming a second diffusion layer 124 on the brightening layer 118; and forming an adhesive material layer 120 on the brightening layer 118 simultaneously to adhere the second diffusion layer 124.

In one embodiment of the present manufacturing method, the step of forming an adhesive material layer 120 on the brightening layer 118 simultaneously to adhere the second diffusion layer 124 comprises: forming an adhesive material layer 120 on the brightening layer 118; and adhering the backlight module 101 to liquid crystal display (LCD) by a packaging process using the adhesive material layer 120.

In one embodiment of the present invention, the material of the adhesive material layer 120 can include silane-based compounds, UV-curing adhesives, transparent optic adhesives, glass adhesives or thermal-curing adhesives.

Please refer to FIGS. 2 and 3, in one embodiment of the present invention, a display apparatus comprises a display panel (not shown) and a backlight module 101. The backlight module 101 comprises: a soft flexible substrate 112 having an outer surface and a flexible substrate; a reflective layer 110 disposed on the outer surface of the soft flexible substrate 112; a white quantum dot light emitting layer 114 disposed on the soft flexible substrate 112; an electrode layer 113 disposed on the white quantum dot light emitting layer 114 for performing an electroluminescence of a white quantum dot to emit on the white quantum dot light emitting layer 114 and covering the soft flexible substrate 112; a first diffusion layer 116 disposed on the electrode layer 113; a brightening layer 118 disposed on the first diffusion layer 116; a second diffusion layer 124 disposed on the brightening layer 118; and an adhesive material layer 120 disposed between the brightening layer 118 and the second diffusion layer 124; wherein the adhesive material layer 120 is used for adhering the brightening layer 118 on the second diffusion layer 124. While the backlight module 101 is rolled out from a cylindrical material roll, the surface of the backlight module 101 is processed. And the backlight module 101 is rolled to form a cylindrical roll again or cut. Then the backlight module 101 is adhered to a substrate.

In one embodiment of the present invention, the soft flexible substrate 112 is patterned by semiconductor processes, such as a photo lithography process and an etching process to form a required optical structure.

In one embodiment of the present invention, the material of the reflective layer 110 includes titanium dioxide, aluminum or a composite material thereof.

In one embodiment of the present invention, the white quantum dot light emitting layer 114 emits a white quantum dot light.

In one embodiment of the present invention, the white quantum dot light emitting layer 114 emits light by using an electroluminescence of the quantum dot.

In one embodiment of the present invention, the material of the adhesive material layer 120 can include silane-based compounds, UV-curing adhesives, transparent optic adhesives, glass adhesives or thermal-curing adhesives.

Figure 5:
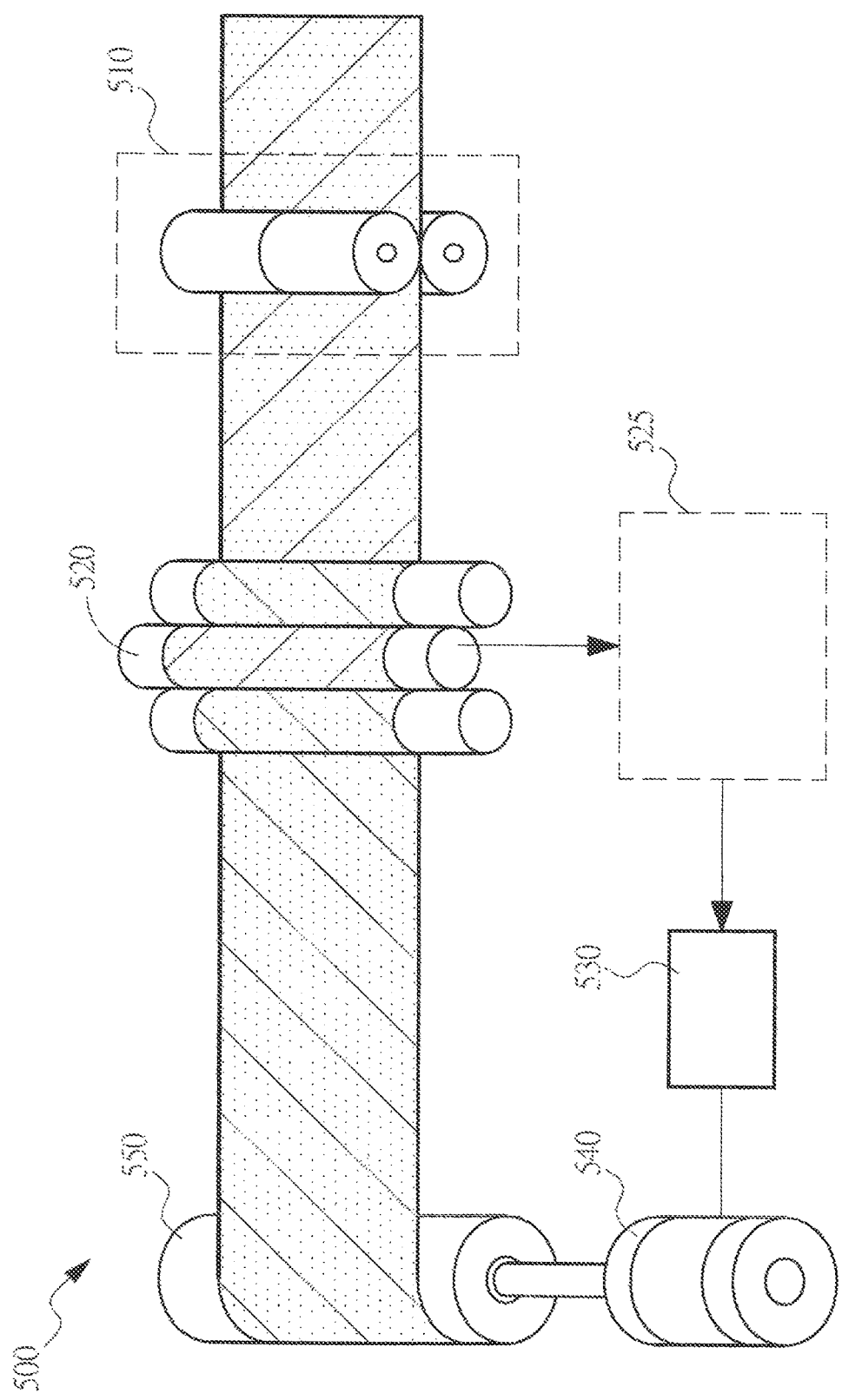
FIG. 5 shows a manufacturing process using a roller production equipment according to one embodiment of the present manufacturing method.

FIG. 5 shows a manufacturing process using a roller production equipment according to one embodiment of the present manufacturing method. Please refer FIGS. 4d and 5, in one embodiment of the present invention, a roller equipment 500 for producing a backlight module 101 comprises: a working unit 510, a roller unit 520, a controlling unit 525, a driver 530, a motor 540 and a feeding wheel 550. The working unit 510 is used for stacking a backlight module 101; the roller unit 520 is used for rolling and pressing the backlight module 101; the controlling unit 525 is used for controlling the roller unit 520; the feeding wheel 550 is used for feeding materials to the backlight module 101; the motor 540 is used for driving the feeding wheel 550; and the driver 530 is used for driving the motor 540; wherein the roller unit 520 connects to the controlling unit 525, the feeding wheel 550 and the working unit 510; one end of the motor 540 connects to the driver 530 and the other end of the motor 540 connects to the feeding wheel 550.

In one embodiment of the present invention, the function of the controlling unit 525 includes: performing a tension feedback, detecting a wheel diameter, outputting a rotating speed, etc.

In one embodiment, the present invention further comprises patterning optical structures on each layer by using the roller equipment 500 and a printing process.

The present invention he can reduce a thickness of a backlight module to achieve a light and thin backlight module, so that a system space of the backlight module is more concise, a manpower cost can be saved, and production efficiency can be improved.

"In some embodiments of the present invention" and "In a variety of embodiments of the present invention" are used repeatedly through the description. They usually mean different embodiments. However, they can also mean the same embodiments. "Comprising", "having" and "including" are synonyms, except it is noted to be different or has other meanings before and after its description.

The present invention has been described in considerable detail with reference to certain preferred embodiments thereof. It should be understood that the description is for illustrative purpose, not for limiting the scope of the present invention. Those skilled in this art can readily conceive simple or equivalent variations and modifications, which are still within the spirit of the present invention.

What is claimed is:

1. A backlight module, comprising:
    a soft flexible substrate having an outer surface and a flexible substrate;
    a reflective layer disposed on the outer surface of the soft flexible substrate;

a white quantum dot light emitting layer disposed on the soft flexible substrate; and an electrode layer disposed on the white quantum dot light emitting layer and covering the soft flexible substrate.

2. The backlight module according to claim 1, further comprising a first diffusion layer disposed on the electrode layer; and a brightening layer disposed on the first diffusion layer.

3. The backlight module according to claim 2, further comprising a second diffusion layer disposed on the brightening layer.

4. The backlight module according to claim 3, further comprising an adhesive material layer disposed between the brightening layer and the second diffusion layer.

5. The backlight module according to claim 4, wherein the adhesive material layer is used for adhering the brightening layer on the second diffusion layer.

6. The backlight module according to claim 1, wherein the soft flexible substrate is patterned by a photo lithography process to form an optical structure.

7. The backlight module according to claim 1, wherein the soft flexible substrate is patterned by an etching process to form an optical structure.

8. The backlight module according to claim 1, wherein the material of the reflective layer includes titanium dioxide, aluminum or a composite material thereof.

9. The backlight module according to claim 1, wherein the white quantum dot light emitting layer emits light by using an electroluminescence of the quantum dot.

10. The backlight module according to claim 4, wherein the material of the adhesive material layer includes silane-based compounds.

11. The backlight module according to claim 4, wherein the material of the adhesive material layer includes UV-curing adhesives.

12. The backlight module according to claim 4, wherein the material of the adhesive material layer includes transparent optic adhesives.

13. The backlight module according to claim 4, wherein the material of the adhesive material layer includes glass adhesives.

14. The backlight module according to claim 4, wherein the material of the adhesive material layer includes thermal-curing adhesives.

15. The backlight module according to claim 1, further comprising patterned optical structures disposed by using a roller equipment and a printing process.

16. The backlight module according to claim 1, further comprising patterned optical structures disposed by using a roller equipment and a laser process.

17. A manufacturing method of a backlight module, comprising:
providing a soft flexible substrate having an outer surface and a flexible substrate;
forming a reflective layer on the outer surface of the soft flexible substrate;
forming a white quantum dot light emitting layer on the soft flexible substrate, wherein the white quantum dot light emitting layer covers the soft flexible substrate by a coating process;
forming an electrode layer on the white quantum dot light emitting layer and covering the soft flexible substrate;
forming a first diffusion layer on the electrode layer;
forming a brightening layer on the first diffusion layer;
forming a second diffusion layer on the brightening layer; and
forming an adhesive material layer on the brightening layer simultaneously;
wherein the adhesive material layer is disposed between the brightening layer and the second diffusion layer for adhering the second diffusion layer.

18. The manufacturing method of a backlight module according to claim 17,
wherein the step of forming an adhesive material layer on the brightening layer simultaneously for adhering the second diffusion layer comprises:
forming an adhesive material layer on the brightening layer; and
adhering the backlight module on a display panel by a packaging process using the adhesive material layer.

19. The manufacturing method of a backlight module according to claim 17, further comprising:
the soft flexible substrate is patterned by semiconductor processes of a photo lithography process and an etching process to form a required optical structure;
the soft flexible substrate is patterned by semiconductor processes of a photo lithography process and an etching process to form a required optical structure;
the material of the reflective layer includes titanium dioxide, aluminum or a composite material thereof; and
the material of the adhesive material layer includes silane-based compounds, UV-curing adhesives, transparent optic adhesives, glass adhesives or thermal-curing adhesives.

20. A backlight module, comprising:
a soft flexible substrate having an outer surface and a flexible substrate;
a reflective layer disposed on the outer surface of the soft flexible substrate;
a white quantum dot light emitting layer disposed on the soft flexible substrate;
an electrode layer disposed on the white quantum dot light emitting layer and covering the soft flexible substrate;
a first diffusion layer disposed on the electrode layer;
a brightening layer disposed on the first diffusion layer;
a second diffusion layer disposed on the brightening layer; and
an adhesive material layer disposed between the brightening layer and the second diffusion layer, wherein the adhesive material layer is used for adhering the brightening layer on the second diffusion layer;
wherein the white quantum dot light emitting layer emits light by using an electroluminescence of the quantum dot; the reflective layer is adhered on the outer surface of the soft flexible substrate for upward reflecting the light emitted from the bottom surface of the white quantum dot light emitting layer.

* * * * *